Sept. 27, 1932. C. C. FARMER 1,879,671
FLUID PRESSURE BRAKE
Filed Oct. 23, 1931
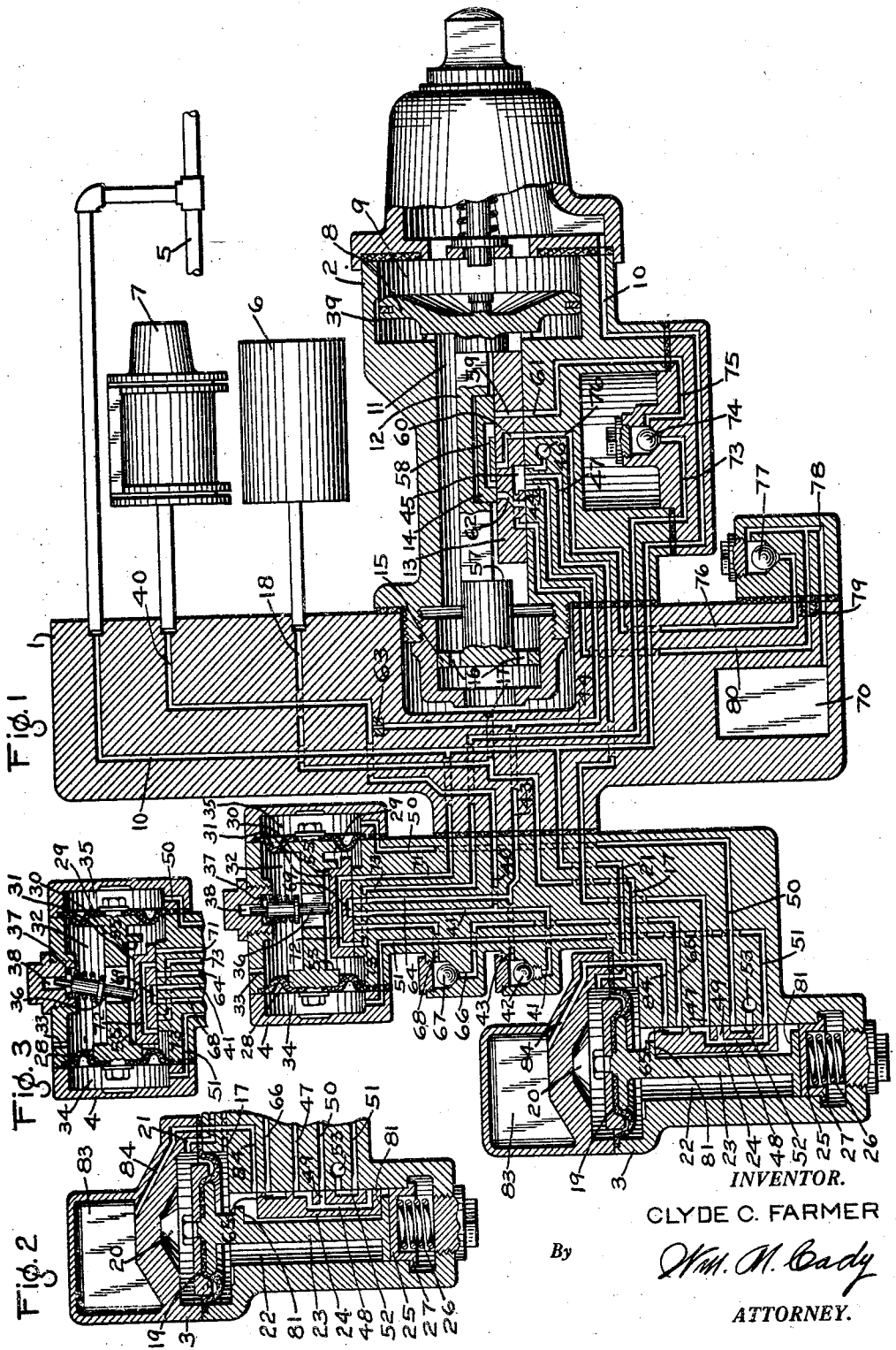
INVENTOR.
CLYDE C. FARMER
By Wm. M. Cady
ATTORNEY.

Patented Sept. 27, 1932

1,879,671

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 23, 1931. Serial No. 570,519.

This invention relates to fluid pressure brakes and more particularly to the type adapted to operate upon a reduction in brake pipe pressure to effect an application of the brakes, and upon an increase in brake pipe pressure to effect a release of the brakes.

In effecting an application of the brakes, particularly on a long train, the brakes at the front end of the train apply in advance of applying the brakes at the rear end of the train, due to which, the slack in the train tends to run in toward the front of the train so harshly as to cause severe shocks, when the train is very long.

The principal object of my invention is to provide an improved brake controlling valve device for obviating the above described, undesirable condition.

In carrying out my invention, I provide a selector valve device, in addition to the usual triple valve device, for controlling quick service venting of fluid under pressure from the brake pipe and for controlling the rate at which fluid under pressure is supplied to the brake cylinder. The selector valve device is provided with two positions and is moved to either one or the other of said positions according to the rate of increase in brake pipe pressure in the front and rear portions of the train in effecting a release of the brakes after an application. In the positioned assumed in the front portion of the train, the selector valve device is adapted to delay or retard the supply of fluid under pressure to the brake cylinder, while to the rear of said front portion of the train, the selector valve device assumes another position in which quick service venting of fluid under pressure from the brake pipe is effected and fluid under pressure is supplied to the brake cylinder at a relatively fast rate. By thus delaying the application of the brakes in the front portion of the train and accelerating the application of the brakes in the rear portion of the train, a more nearly synchronous application of the brakes on the entire train is obtained.

Other objects and advantages will appear in the following more detailed description of my invention.

In the accompanying drawing; Fig. 1 is a diagrammatic view, mainly in section, of a fluid pressure brake equipment showing a brake controlling valve device with the various parts in the position assumed in the rear portion of a train when the brakes are released; Fig. 2 is a diagrammatic view of the pilot valve device shown in Fig. 1, but with the slide valve in the position assumed in the front portion of the train when the brakes are released; and Fig. 3 is a diagrammatic view of the selector valve device shown in Fig. 1, but with the slide valve shown in the position assumed in the front portion of the train when the brakes are released.

The brake controlling valve device comprises a bracket 1 on which is preferably mounted a triple valve device 2, a pilot valve device 3, and a selector valve device 4, and connected to said bracket is the usual brake pipe 5, auxiliary reservoir 6 and brake cylinder 7.

The triple valve device 2 comprises a piston 8 having at one side a chamber 9 connected, through passage 10, to the brake pipe 5 and having at the opposite side a valve chamber 11 connected to the auxiliary reservoir 6. The piston 8 is provided with a stem 12 for operating a main slide valve 13 and an auxiliary slide valve 14 contained in valve chamber 11. The stem 12 has at its outer end a guide member 15, which is provided with a plurality of apertures 16, through which the valve chamber 11 is connected to passage 17, which connects with the auxiliary reservoir 6 by means of passage and pipe 18.

The pilot valve device 3 comprises a flexible diaphragm 19 having at one side a chamber 20 connected to the brake pipe 5 through passages 21 and 10, and having at the other side a valve chamber 22 connected to the auxiliary reservoir 6 through passage 17 and passage and pipe 18. The diaphragm 19 is provided with a stem 23 in chamber 22 for operating a slide valve 24. Resistance means are provided in the outer end of valve chamber 22 for opposing certain operation of the diaphragm 19, said resistance means comprising a plunger 25 for engaging the stem 23 and a spring 26 acting on said plunger. The plunger 25 is provided with a collar like projection 27 at one end, said projection being adapted to engage a corresponding shoulder in the casing for limiting movement of said plunger by the spring 26.

The selector valve device 4 is adapted to be controlled in accordance with the operation of the pilot valve device 3 and comprises two spaced flexible diaphragms 28 and 29, which are operatively connected to each other by means of a stem 30, through which a slide valve 31 is adapted to be operated. A chamber 32 is formed intermediate said diaphragms and is at all times open to the atmosphere through a passage 33. A chamber 34 is formed at the outer side of the diaphragm 28 and a chamber 35 is formed at the outer side of the diaphragm 29. The slide valve 31 is pressed into engagement with its seat by means of a rocking pin 36, which is subject to the constant pressure of a spring 37. One end of said pin engages the slide valve 31 in a suitable recess, while the other end loosely extends into a suitable bore 38.

In operation, to initially charge the brake equipment with fluid under pressure, fluid under pressure is supplied to the brake pipe 5 in the usual manner and flows from said brake pipe through passage 10 to the triple valve piston chamber 9, and also from passage 10 through passage 21 to the pilot valve chamber 20.

With the triple valve piston 8 in the release position shown in the drawing, fluid under pressure flows from piston chamber 9 through a feed groove 39 to valve chamber 11, and from thence through the apertures 16 in the piston stem guide 15, and through passages 17 and 18 to the auxiliary reservoir 6, and also through passage 17 to the pilot valve chamber 22.

In the release position of the triple valve slide valve 13, the brake cylinder 7 is open to the atmosphere through pipe and passage 40, passage 41, past a release check valve 42, through passages 43 and 44, a cavity 45 in the triple valve slide valve 13 and a restricted atmospheric passage 46. A passage 47, which extends to the seat of the pilot valve slide valve 24, is connected to release cavity 45 in the triple valve slide valve 13 when said slide valve is in release position, so that in releasing the brakes after an application, as will be hereinafter fully described, fluid at brake cylinder pressure flows from cavity 45, through said passage and the pilot valve device 3, to the selector valve device 4 for adjusting the selector valve device in accordance with the position or location of a car in a train, as governed by the operation of the pilot valve device 3.

In charging a train, it is customary for the engineer to first move the usual brake valve device (not shown) to release position for supplying fluid at high pressure directly from the usual main reservoir to the brake pipe for the purpose of accelerating the increase in the brake pipe pressure. Then, after a certain lapse of time, the brake valve device is moved to running position, in which the pressure of fluid supplies to the brake pipe is governed by the usual feed valve device (not shown). In charging the brake pipe in this manner, the pressure in the brake pipe at the front end of the train is increased at a rapid rate and to a high degree relative to the pressure in the auxiliary reservoir.

Since the pilot valve diaphragm 19 is subject in chamber 20 to the brake pipe pressure and in valve chamber 22 to auxiliary reservoir pressure, the rapid increase in brake pipe pressure in chamber 20 at the head end of the train creates sufficient pressure differential on the diaphragm 19 to move said diaphragm downwardly against the opposing pressure of spring 26. This downward movement of the diaphragm 19 is limited by engagement with the casing and is adapted to move the slide valve 24 from the position shown in Fig. 1 to the delay position shown in Fig. 2.

With the pilot valve slide valve 24 in the delay position, passage 47 leading to the seat of the triple valve slide valve 13 is connected, through cavity 48 and port 49 in the pilot valve slide valve, to a passage 50 leading to chamber 35 of the selector valve device, so that in effecting a release of the brakes, fluid at brake cylinder pressure supplied to passage 47 flows to chamber 35 and acts on the diaphragm 29. Chamber 34 at the outer side of the diaphragm 28 is at this time open to the atmosphere through a passage 51, a cavity 52 in the pilot valve slide valve 24 and an atmospheric passage 53, which permits the fluid pressure in chamber 35 to move the selector valve diaphragms 29 and 28 and shift the slide valve 31 to the delay position shown in Fig. 3. In releasing the brakes, the pressure of fluid in chamber 35 of the selector valve device reduces with the venting of fluid under pressure from the brake cylinder, and when thus reduced to substantially atmospheric pressure, the stress of the diaphragms 29 and 28 return said diaphragms and stem 30 to their normal or unstressed position as shown in Figs. 1 and 3. This movement of the diaphragms 28 and 29 is relative to slide valve 31, there being lost motion provided between the slide valve 31 and the slide valve operating lugs 55 on the stem 30 for permitting the relative movement.

The pilot valve diaphragm 19 and stem 23 are held in their lower position by the rapid rate of increase in brake pipe pressure, until the auxiliary reservoir pressure in valve chamber 22 becomes built up to within a predetermined degree of the brake pipe pressure carried and acting in chamber 20, at which time the spring 26 moves said diaphragm and stem to the position shown in the drawing. This movement is relative to the slide valve 24, due to lost motion provided between said slide valve 24 and the operating shoulders 81 on the stem 23, so that at the head end of the train the slide valve 24 remains in the position shown in Fig. 2. In this position, an inshot reservoir 83 is connected, through passage 84, to the pilot valve chamber 22 and is thus supplied with fluid at auxiliary reservoir pressure from said chamber.

In the rear portion of the train where the rate of increase in brake pipe pressure is relatively slow, the auxiliary reservoir 6 is charged with fluid under pressure, through the feed groove 39 in the triple valve device, at substantially the same rate as the brake pipe pressure is increased. Consequently, an insufficient difference in pressures is obtained in chambers 20 and 22 at the opposite sides of the pilot valve diaphragm 19, to cause said diaphragm to move and compress spring 26. The slide valve 24 thus remains in the position shown in Fig. 1, to which position it is moved in effecting an application of the brakes, as will be hereinafter fully described.

With the pilot valve slide valve 24 in the position shown in Fig. 1, passage 47, which is supplied with fluid under pressure from the brake cylinder in effecting a release of the brakes, is connected, through cavity 48 in the pilot valve slide valve 24, to passage 51 leading to chamber 34 in the selector valve device 4. Chamber 35 in the selector valve device is at this time vented to the atmosphere through passage 50, cavity 52 in the pilot valve slide valve 24 and through the atmospheric passage 53, so that the pressure of fluid in chamber 34 moves the diaphragms 28 and 29 and shifts the slide valve 31 to the position shown in Fig. 1. Then, when the pressure in diaphragm chamber 34 becomes reduced to a low degree upon a substantially complete release of fluid under pressure from the brake cylinders 7, the stress in diaphragms 28 and 29 moves said diaphragms, relative to the slide valve 31, to their unstressed position.

It will here be noted that when the brakes are released, the selector valve device is positioned as shown in Fig. 2 at the head end of the train and as shown in Fig. 1 at the rear end of the train, the positioning of the selector valve device being controlled by the operation of the pilot valve slide valve 24 in the front and rear portions of the train as governed by the rate of increase in brake pipe pressure.

When a train is made up, the pilot valve slide valve 24 and selector valve slide valve 31 in cars at the front of the train may be in the position desired at the rear of the train, while at the rear of the train said valves may be in the position required at the front end of the train. Therefore, before operating the train it is necessary to effect an application of the brakes and then a release of the brakes to properly position said slide valves, as above described.

When it is desired to effect an application of the brakes, fluid under pressure is vented from the brake pipe 5 in the usual manner, and since the triple valve piston chamber 9 and pilot valve diaphragm chamber 20 are at all times in communication with the brake pipe, the pressure of fluid in said chambers reduces the brake pipe pressure.

When the pressure in piston chamber 9 is thus reduced a predetermined degree below the auxiliary reservoir pressure acting in valve chamber 11, the triple valve piston first moves the auxiliary slide valve 14 relative to the main slide valve 13 to quick service position in which a shoulder 57 on the piston stem 12 engages the end of the main slide valve. Then as the pressure in the brake pipe continues to reduce, the piston 8 moves the main slide valve to service position in which a service port 62 registers with passage 44. The service port 62 is uncovered by the initial relative movement of the auxiliary slide valve 14 to the main slide valve 13, so that with the main slide valve in service position, fluid under pressure is permitted to flow from the valve chamber 11 and auxiliary reservoir 6, which is at all times connected to said chamber, to passage 44.

Passage 44 leads to a choke plug 63 and is connected by the passage 43 to the top of the release check valve 42, and also through passage 43 and passage 64 to the seat of the selector slide valve 30. With the selector slide valve in the position shown in Fig. 3 as assumed in the front portion of the train, the passage 64 is lapped, so that fluid under pressure supplied to passage 44 is permitted to flow to the brake cylinder 7 only through the choke plug 63 and from thence through passage and pipe 40 leading to said brake cylinder.

The reduction in brake pipe pressure acting in diaphragm chamber 20 of the pilot valve device, permits auxiliary reservoir pressure in valve chamber 22 to move the diaphragm 19 upwardly at substantially the same time as the triple valve device moves to service application position. In the front portion of the train, the upward movement of diaphragm 19 shifts the slide valve 24 from the position shown in Fig. 2 to the position shown in Fig. 1, in which position fluid under pressure is vented from the inshot reservoir 83 to the brake cylinder 7 through passage 84, a cavity 65 in the pilot valve slide valve 24, passage 66, past a check valve 67, through passage 68, a cavity 69 in the selector slide valve 31 and from thence through passages 41 and 40. This supply of fluid under pressure from the inshot reservoir 83 to the brake cylinder 7 is limited in amount, but is at a rapid rate for promptly moving the usual brake cylinder piston past the usual leakage grooves in the brake cylinder, after which, effective brake cylinder pressure for applying the brakes in the front portion of the train is obtained at a slow rate, as governed by the flow area of the choke plug 63.

After equalization of pressures in the inshot reservoir 83 and brake cylinder 7, the check valve 67 seats so as to prevent back flow to said reservoir as the brake cylinder pressure is increased by the supply through the choke plug 63.

In the rear portion of the train, where the selector valve slide valve 31 is in the position shown in Fig. 1, a quick service reduction in brake pipe pressure is effected, when the triple valve device is moved to quick service position, by venting fluid under pressure from the brake pipe 5 to a quick service reservoir 70 by way of passages 10 and 71, through cavity 72 in the selector slide valve, passage 73, past a check valve 74, through a passage 75, a port 59 in the main slide valve 13, cavity 58 in the auxiliary slide valve 14, port 60 in the main slide valve 13, passage 76, past a check valve 77 and through a passage 78 to said reservoir. A quick service reduction is not effected in the front portion of the train since passage 71, through which the quick service venting of fluid under pressure from the brake pipe occurs, is lapped by the selector valve slide valve 31 in the front portion of the train.

Since a reduction in brake pipe pressure occurs first at the front of the train and then travels toward the rear of the train, due to the fact that a brake pipe reduction is effected by the usual brake valve device, the operation of the first brake controlling valve device to the rear of those set in the position shown in Fig. 3, effects a local quick service reduction in brake pipe pressure for causing the brake controlling valve devices to the rear to operate serially in a similar manner and thereby accelerate the reduction in brake pipe pressure and cause the triple valve devices to move to service position in which fluid under pressure is supplied from the auxiliary reservoir 6 to the brake cylinder 7 by way of the triple valve chamber 11, through the service port 62, passages 44, 43 and 64, cavity 69 in the selector slide valve 31, through passage 41 and passage and pipe 40. A portion of the fluid under pressure obtained in the brake cylinder may flow through the choke plug 63 as occurs in the front portion of the train, but it will be noted that the main flow occurs through a by-pass of greater flow area, which by-pass is established through the selector slide valve 31 when set in the position shown in Fig. 1, as assumed in the rear portion of the train.

In quick service position of the triple valve device, the quick service reservoir 70 is open to the atmosphere through passage 78, choke plug 79, passage 80, release cavity 45 in the triple valve slide valve 13 and the restricted atmospheric passage 46, so that fluid under pressure vented from the brake pipe to the quick service reservoir 70 tends to flow to the atmosphere, but this flow is so restricted by the choke plug 79 as not to interfere with the quick service operation.

It will here be noted that in effecting a service application of the brakes, the brakes on the front portion of the train are applied by the gradual reduction in brake pipe pressure caused by operation of the usual brake valve device, while to the rear of the train the brake pipe reduction is accelerated by locally effecting a quick service reduction in brake pipe pressure on each car. In other words, according to my invention the passage leading from the brake pipe to the triple valve device, through which fluid under pressure is vented from the brake pipe in effecting a quick service reduction in brake pipe pressure, is controlled by the selector slide valve 31 in such a manner as to prevent quick service venting of fluid under pressure from the brake pipe on cars at the head end of the train. This varying of the brake pipe reduction in the front and rear portions of the train in conjunction with the delayed or retarded supply of fluid under pressure to the brake cylinder on cars in the front portion of the train and the more rapid rate of supply of fluid under pressure to the brake cylinder on cars in the rear portion of the train produces a more nearly synchronous application of the brakes at the front and rear of the train, thereby reducing train shock, due to the running in of slack, to a safe degree.

In order to release the brakes after an application, fluid under pressure is supplied to the brake pipe and from thence to the triple valve piston chamber 9 and pilot valve diaphragm chamber 20. The triple valve piston 8 and slide valves 12 and 13 are shifted to release position by the increase in brake pipe pressure, in which position the auxiliary reservoir 6 is charged with fluid under pressure from the brake pipe through the feed groove 39, and fluid under pressure is vented from the brake cylinder 7 by way of the exhaust cavity 45 in the triple valve slide valve 13, in the same manner as hereinbefore described.

The pilot valve device 3 is operated by the rapid rate of increase in brake pipe pressure in the front portion of the train to move the slide valve 24 to the position shown in Fig. 2 of the drawing in which position the inshot reservoir 83 is charged with fluid at auxiliary reservoir pressure from the pilot valve chamber 22 by way of passage 84. With the slide valve 24 in this position, communication is established through which fluid at brake cylinder pressure is supplied from passage 47 to passage 50 leading to the selector valve chamber 35, but since the slide valve 31 was properly set in releasing the brakes after the application following the initial charging of the train, the movement of the diaphragms 28 and 29 by fluid under pressure supplied to chamber 35 does not change the setting of slide valve 31.

In the rear portion of the train, the pressure of spring 26 prevents the relatively slow increase in brake pipe pressure in the pilot valve diaphragm chamber 20 from moving the pilot valve slide valve 24 from the position shown in Fig. 1, in effecting a release of the brakes. Consequently, fluid at brake cylinder pressure is supplied through the pilot valve slide valve 24 to chamber 34 of the selector valve device and moves the diaphragms 28 and 29 toward the right hand as hereinbefore described, but the selector slide valve 30 being initially properly set in the train, this movement of diaphragms 28 and 29 is relative to said slide valve and does not change its setting.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, of a valve device operative upon a reduction in brake pipe pressure to establish a communication through which fluid under pressure is adapted to be vented from said brake pipe, and valve means operative in accordance with the increase in brake pipe pressure for controlling the communication from said brake pipe to said valve device through which fluid under pressure is adapted to be vented from said brake pipe by the operation of said valve device.

2. In a fluid pressure brake, the combination with a brake pipe and a brake cylinder, of a valve device operative upon a reduction in brake pipe pressure to supply fluid under pressure to said brake cylinder and to establish a communication through which fluid under pressure is adapted to be vented from said brake pipe, said valve device being operative upon an increase in brake pipe pressure to vent fluid under pressure from said brake cylinder, and valve means for controlling the communication from said brake pipe to said valve device through which fluid under pressure is adapted to be vented from said brake pipe, said valve means being operative upon a predetermined increase in brake pipe pressure to close said communication.

3. In a fluid pressure brake, the combination with a brake pipe and a brake cylinder, of a valve device operative upon a reduction in brake pipe pressure to supply fluid under pressure to said brake cylinder and to establish a communication through which fluid under pressure is adapted to be vented from said brake pipe, said valve device being operative upon an increase in brake pipe pressure to vent fluid under pressure from said brake cylinder, and valve means positioned in accordance with the increased in brake pipe pressure for controlling the supply of fluid under pressure from said valve device to said brake cylinder and for controlling the communication from said brake pipe to said valve device through which fluid under pressure is adapted to be vented from said brake pipe.

4. In a fluid pressure brake, the combination with a brake pipe and a brake cylinder, of a valve device operative upon a reduction in brake pipe pressure to supply fluid under pressure to said brake cylinder and to establish a communication through which fluid under pressure is adapted to be vented from said brake pipe, said valve device being operative upon an increase in brake pipe pressure to vent fluid under pressure from said brake cylinder, a valve having one position for closing the communication from the brake pipe to said valve device and another position for opening said communication, and means operated in accordance with the increase in brake pipe pressure for positioning said valve.

5. In a fluid pressure brake, the combination with a brake pipe and a brake cylinder, of a valve device operative upon a reduction in brake pipe pressure to supply fluid under pressure to said brake cylinder and to establish a communication through which fluid under pressure is adapted to be vented from said brake pipe, said valve device being operative upon an increase in brake pipe pressure to vent fluid under pressure from said brake cylinder, a valve having one position for closing the communication from the brake pipe to said valve device and for retarding the supply of fluid under pressure from said valve device to said brake cylinder and another position for opening said communication and for permitting an unrestricted flow of fluid under pressure from said valve device to said brake cylinder, and means operated in accordance with the rate of increase in brake pipe pressure for controlling the position of said valve.

6. In a fluid pressure brake, the combination with a brake pipe and a brake cylinder, of a brake controlling valve device operative upon a reduction in brake pipe pressure to establish a communication through which fluid under pressure is vented from said brake pipe and to supply fluid under pressure to said brake cylinder to effect an application of the brakes, said brake controlling valve device being operative upon an increase in brake pipe pressure to vent fluid under pressure from said brake cylinder for effecting a release of the brakes, a valve having one position for closing the communication from said brake pipe to said brake controlling valve device through which fluid under pressure is vented from the brake pipe, and for retarding the supply of fluid under pressure to said brake cylinder, said valve having another position for opening said communication and for permitting an unrestricted flow of fluid under pressure to said brake cylinder, means operated by fluid under pressure from the brake cylinder in releasing the brakes for positioning said valve and valve means controlled by the increase in brake pipe pressure for governing the supply of fluid under pressure from said brake cylinder to said means.

7. In a fluid pressure brake, the combination with a brake pipe, of a brake controlling valve device operative upon a reduction in brake pipe pressure to effect an application of the brakes, means operative upon movement of said valve device in effecting an application of the brakes for venting fluid under pressure from the brake pipe through said valve device to effect local quick service action, and valve means operative upon a rapid increase in brake pipe pressure for rendering said means inoperative to vent fluid from the brake pipe.

8. In a fluid pressure brake system for a train of cars, the combination with a brake controlling valve device operative upon a reduction in brake pipe pressure to effect an application of the brakes and to vent fluid under pressure from the brake pipe for effecting a local quick service reduction in brake pipe pressure, and valve means for controlling the communication from the brake pipe to said valve device through which fluid is vented from the brake pipe, and operative upon an increase in brake pipe pressure at the head end of the train for closing said communication.

In testimony whereof I have hereunto set my hand, this 21st day of October, 1931.

CLYDE C. FARMER.